United States Patent [19]

Aguinet et al.

[11] 4,276,277

[45] Jun. 30, 1981

[54] MANUFACTURE OF CONCENTRATED NITRIC ACID

[75] Inventors: Gerard Aguinet, Meudon; André Le Bras, St-Andre-Les-Lilles; Jean Manoury, Ville D'Avray; Edouard Martin, St-Cloud, all of France

[73] Assignee: Produits Chimiques Ugine Kuhlmann, Paris, France

[21] Appl. No.: 9,293

[22] Filed: Feb. 5, 1979

Related U.S. Application Data

[63] Continuation of Ser. No. 823,694, Aug. 11, 1977, abandoned, which is a continuation of Ser. No. 389,866, Aug. 20, 1973, abandoned, which is a continuation-in-part of Ser. No. 152,103, Jun. 11, 1971, abandoned.

[30] Foreign Application Priority Data

Jun. 12, 1970 [FR] France ............................ 70.21795

[51] Int. Cl.³ ............................................ C01B 21/40
[52] U.S. Cl. ................................................. 423/393
[58] Field of Search ........................ 423/392, 393, 394

[56] References Cited

U.S. PATENT DOCUMENTS

| 2,088,057 | 7/1937 | Handforth | 423/392 X |
| 3,472,640 | 10/1969 | Riga | 423/393 |
| 3,658,472 | 4/1972 | Aguinet et al. | 423/393 |

FOREIGN PATENT DOCUMENTS

| 456518 | 11/1936 | United Kingdom | 423/393 |
| 910131 | 11/1962 | United Kingdom | 423/393 |

Primary Examiner—G. O. Peters
Attorney, Agent, or Firm—Pennie & Edmonds

[57] ABSTRACT

A process for the manufacture of nitric acid comprises contacting a mixture of starting gas, containing oxygen, nitrogen oxides and, possibly water, this mixture being previously cooled, oxidized and, optionally dried, with cooled nitric acid aqueous solution to provide a solution of nitrogen oxides in nitric acid aqueous solution, consisting fundamentally in that the said solution is reacted according to the reaction:

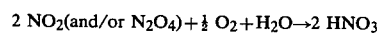

$$2\ NO_2(\text{and/or } N_2O_4) + \tfrac{1}{2}\ O_2 + H_2O \rightarrow 2\ HNO_3$$

with the air previously contacted with the solution of nitrogen oxides in the highly concentrated nitric acid resulting from the said reaction, so as to rid the said highly concentrated acid of the nitrogen oxides dissolved therein.

2 Claims, 5 Drawing Figures

MANUFACTURE OF CONCENTRATED NITRIC ACID

CROSS REFERENCE TO PRIOR APPLICATION

This is a continuation, of application Ser. No. 823,694, filed Aug. 11, 1977, which in turn is a continuation of Ser. No. 389,866, filed Aug. 20, 1973, which in turn is a continuation-in-part of Ser. No. 152,103, filed June 11, 1971, all now abandoned.

The present invention relates to the manufacture of concentrated nitric acid from gas mixtures containing oxygen, nitrogen oxides and, possibly, water.

Such mixtures can result, notably, from the catalytic combustion of ammonia in the presence of air or various organic nitration or oxidation reactions such as the nitric acid oxidation of cyclohexanol-cyclohexanone mixtures into adipic acid or, again, reactions of nitric acid on metals and minerals.

Conventionally, a process for manufacturing nitric acid from, for instance, the combustion gases of ammonia, can be described as follows:

combustion of ammonia in air occurs at atmospheric pressure, or under pressure, according to the principal reaction:

$$4NH_3 + 5O_2 \rightarrow 4NO + 6H_2O \tag{I}$$

and the combustion gases contain about 10% NO and 17% steam by volume.

After having released a portion of their calories in a heat recovery system the gases are cooled, however the major portion of the steam the gases contain is condensed in the form of nitric acid the concentration of which depends principally on the catalytic pressure.

Prior to, or after, the addition of supplementary air and possible oxidation according to the reaction $$2NO + O_2 \rightarrow 2NO_2 \tag{II}$$

the gases can be compressed or uncompressed as the case may be.

They are then eventually cooled, dried (with the production of nitric acid) and oxidized again before being introduced into an absorption column, generally including plates, on which the gas enters into contact with the acid already formed on the upper plates. In the present description, for reasons of simplification, only one absorption column is mentioned, but it should be understood that several columns can be used. Nitric acid is produced in the said column according to the reaction:

$$3NO_2 (\text{or } 3/2 N_2O_4) + H_2O \rightarrow 2HNO_3 + NO \tag{III}$$

The NO by-product should then be oxidized according to reaction (II), which necessitates a more or less large free volume between the plates. The upper portion of the absorption column is supplied with water recovered during the general manufacturing process, while the nitric acids produced during the above-mentioned cooling are introduced onto the plates of a titer near their theoretical titers.

The calories released during reactions (III) and (II) in the column are evacuated by means of a cooling fluid. Generally speaking, this operation is effected with coils immersed in the acid present on the plates.

The gases leaving the absorption column, and which only contain a very small percentage of nitrogen oxides, are then reheated before being passed into a recovery turbine which provides a more or less large amount of the energy necessary for the compression of the nitrous gases and/or the additional air which may be necessary to ensure oxidation of said gases.

Commercial titer nitric acid, loaded with dissolved nitrous products flows out from the lower portion of the absorption column. Said mixture, reheated or not, is then passed to the upper portion of a denitration apparatus, supplied at the lower portion thereof with air, which may be compressed or uncompressed, the temperature of which varies according to the process used. The nitric acid is then depleted of the dissolved nitrous products, and can be passed into a storage reservoir, while the air leaving the denitration apparatus, and loaded with nitrous products, is added to the abovementioned additional air to be introduced into the nitric acid manufacturing unit.

The major drawback of these methods using the aforesaid processes lies essentially in the necessary large size of the absorption unit. In fact, after reaction (III), any absorption of 3 volumes of $NO_2$ is accompanied by the formation of a volume of NO by-product which must then be oxidized according to reaction (II) before being absorbed. Taking the velocity of this reaction (II) into account, it is necessary to provide a more or less large volume between each absorption plate.

Owing to its favorable influence on reaction (III), the increase in the working pressure in the absorption unit would theoretically enable the volume of the absorption column to be decreased to a notable extent. However, the large amount of calories to be evacuated during absorption, and particularly at the head, does not permit this working pressure to be increased as much as is desirable.

A second drawback to these methods is that they do not permit the direct manufacture of a nitric acid having a titer higher than about 70–71% $HNO_3$. In fact, on the first absorption plate, the laws of equilibrium between the gas leaving the plate and the nitric acid present on said plate forbid the manufacture of nitric acid of a titer higher than about 71% following the formation of NO during reaction (III), which has the effect of lowering the oxidation rate of gases leaving the plate, and therefore the titer of the acid, to equilibrium.

Certain improvements which have been the object of patents (see, for instance, French Pat. No. 1,541,941 and No. 1,585,251, or the patent application published in the German Federal Republic with the No. 1,277,220) enable the first drawback mentioned hereinabove to be attenuated but not to avoid the second drawback relating to the maximum concentration of the acid produced.

In another connection, certain processes permit the gases entering into absorption to be enriched in nitrous products, so that the titer of the acid produced can be higher than 70–71% $HNO_3$ and even as high as 75% $HNO_3$. One of these processes was the object of French Pat. No. 1,538,686. A similar process is described in the French Patent application published under the No. 2,003,941. Finally, in French Pat. No. 1,114,970, a process is described which permits a nitric acid to be produced with a titer which can be as high as 90% $HNO_3$ by oxidation, in air or oxygen, of a mixture containing nitric acid titrating 68% and 3 to 4 times the weight of said acid in the form of liquid $N_2O_4$. The drawbacks of the processes described in these patents is that, in any case, they necessitate the preliminary manufacture, by absorption, of acid having a commercial titer (60 to 70% HNO₃). Said processes, if they avoid the second drawback described hereinabove with respect to the concentration of the acid produced, possess the first drawback relating to the volume of the absorption system, to which is added the necessity of using additional apparatus.

However, processes exist in which the absorption volume is practically non-existant and which permit very highly concentrated (99% NHO₃) nitric acid to be manufactured. One of these processes was the object, notably, of French Pat. No. 932,752. This type of process, based on the direct manufacture of nitric acid under high pressure of approximately 50 atmospheres, by reaction of oxygen, dilute nitric acid and liquid N₂O₄ according to the reaction:

$$2NO_2(\text{and/or } N_2O_4) + \tfrac{1}{2}O_2 + H_2O \rightarrow 2HNO_3 \quad (IV)$$

has three major drawbacks: the use of oxygen, operation at very high pressure and the necessity of a cooling fluid independant of the nitric acid unit to ensure liquifaction of N₂O₄, which results in a very large consumption of power.

The present invention, which is based essentially on the combination of two phenomena which are well known in themselves, that is, on the one hand, the solubility of nitrogen oxides in aqueous solutions of nitric acid and, on the other hand, the possibility of directly manufacturing nitric acid without a NO by-product, according to reaction (IV) hereinabove for example, enables all the aforesaid drawbacks to be avoided, owing to the fact that the conventional absorption zone is no longer necessary, and that it is no longer advisable to work at high pressures, however, the titer of the nitric acid produced can be higher than 80% HNO₃.

The process according to the invention permits both of the drawbacks described above to be avoided.

This process, which consists in contacting the mixture of the starting gas, containing oxygen, nitrogen oxides and, possibly, water, this mixture being previously cooled, oxidized and, should the occasion arise dried, with cooled nitric acid aqueous solution to provide a solution of nitrogen oxides in nitric acid aqueous solution, consisting fundamentally in that the said solution is reacted according to the reaction:

$$2NO_2(\text{and/or } N_2O_4) + \tfrac{1}{2}O_2 + H_2O \rightarrow 2\ NHO_3$$

with the air previously contacted with the solution of nitrogen oxides in the highly concentrated warmed nitric acid resulting from the said reaction, so as to rid the said highly concentrated acid of the nitrogen oxides dissolved therein.

More particularly the present invention provides, in a first embodiment, a continuous process for the manufacture of very concentrated nitric acid having a titer of at least 70% from a gaseous mixture under superatmospheric pressure containing nitrogen oxides, oxygen, inert gases, and small amounts of steam, which consists essentially in (1) continuously passing a gaseous mixture under superatmospheric pressure but under 50 atmospheres, preferably from 1.5 to 10 atmospheres, containing nitrogen oxides, oxygen, inert gases and small amounts of steam through a cooled area whereby the majority of said nitrogen oxides are oxidized to nitrogen dioxide and said steam is condensed to a weak nitric acid solution, (2) continuously dissolving said oxidized nitrogen oxides in a very concentrated nitric acid solution of the desired titer, (3) continuously mixing said very concentrated nitric acid solution containing dissolved oxidized nitrogen oxides, said weak nitric acid solution and air containing nitrogen oxides for a time and temperature sufficient to substantially effect the reaction:

$$2NO_2(\text{or } N_2O_4) + \tfrac{1}{2}O_2 + H_2O \rightarrow 2HNO_3,$$

(4) continuously removing a very concentrated nitric acid having a titer of at least 70% and containing some dissolved unconverted oxidized nitrogen oxides therein and an air stream containing nitrogen oxides and some nitric acid vapor from said mixing step, (5) continuously treating said very concentrated nitric acid having a titer of at least 70% and containing some dissolved unconverted oxidized nitrogen oxides therein with air under superatmospheric pressure but under 50 atmospheres preferably from 1.5 to 10 atmospheres, whereby said dissolved oxidized nitrogen oxides are removed into said air, (6) continuously passing said air containing oxidized nitrogen oxides to said mixing step 3, (7) continuously passing said air stream containing nitrogen oxides and some nitric acid vapor from step 4 to said step 1, and (8), continuously recovering said very concentrated nitric acid of the desired titer of at least 70% and recycling a portion of it to said step 2.

In this first embodiment, the majority of the gaseous mixture is preferably derived from the oxidation of ammonia; and the superatmospheric pressure is more preferably between 5 to 10 absolute atmospheres and is especially preferably between 5 and 6 absolute atmospheres, while the dissolving step is preferably conducted with very concentrated nitric acid of the desired titer at temperatures of below 0° C.

More particularly the present invention provides, in a second embodiment, a continuous process for the manufacture of very concentrated nitric acid having a titer of at least 70% from a gaseous mixture under superatmospherhic pressure containing nitrogen oxides, oxygen, inert gases and steam which consists essentially in (1) continuously contacting a gaseous mixture under superatmospheric pressure but under 50 atmospheres, preferably from 1.5 to 10 atmospheres, containing nitrogen oxides, oxygen, inert gases and water vapor with a weak nitric acid solution having a concentration lower than that in equilibrium with the nitrogen oxides in said gaseous mixture under the prevailing conditions with simultaneous cooling of said weak nitric acid solution whereby a gaseous mixture having a lower temperature and a lower content of NO₂ and water vapor and a higher content of NO and a nitric acid solution having a higher concentration are continuously obtained, respectively, (2) continuously passing said gaseous mixture having a higher content of NO through a free space within which oxidation of NO to NO₂ takes place, (3) continuously intimately contacting said gaseous mixture after passage through said free space with said nitric acid solution having a higher concentration, with simultaneous cooling of said nitric acid solution whereby the gaseous mixture after contacting said nitric acid solution has a lower content of NO₂ and water vapor and the nitric acid concentration is further increased, (4) repeating said steps (2) and (3) until a nitric acid solution having a titer of about 60% and a gaseous mixture substantially dry and depleted of nitrogen oxides are obtained respectively, (5) continuously dissolving substantially all of said nitrogen oxides in said gaseous mixture depleted of nitrogen oxides in a very concentrated nitric acid of the desired titer, (6) continuously mixing said nitric acid solution having a titer of about 60% and air containing nitrogen oxides for a time and temperature sufficient to substantially effect the reaction:

$$2NO_2(or\ N_2O_4) + \tfrac{1}{2}O_2 + H_2O \rightarrow 2HNO_3,$$

(7) continuously removing a very concentrated nitric acid having a titer of at least 70% and containing some dissolved unconverted oxidized nitrogen oxide therein, and an air stream containing nitrogen oxides and some nitric acid vapor from said mixing step, (8) continuously mixing said very concentrated nitric acid having a titer of at least 70% and containing some dissolved unconverted oxidized nitrogen oxides therein with said very concentrated nitric acid of the desired titer having dissolved nitrogen oxides therein from step 5 and treating said mixture with air under superatmospheric pressure but under 50 atmospheres, preferably from 1.5 to 10 atmospheres, whereby said dissolved oxidized nitrogen oxides are removed into said air, (9) continuously passing said air containing oxidized nitrogen oxides to said mixing step 6, (10) continuously passing said air stream containing nitrogen oxides and some nitric acid vapor from step 7 to step 1, and (11) continuously recovering said very concentrated nitric acid of the desired titer of at least 70% and recycling a portion of it to said step 5.

In this second embodiment, the starting gas mixture containing steam is partially condensed forming the weak nitric acid solution of step 1; the undissolved gases resulting from step 5 are washed with water to form said weak nitric acid solution of step 1; a majority of said gaseous mixture is derived from the oxidation of ammonia; the superatmospheric pressure is more preferably between 5 to 10 absolute atmospheres and is especially preferably between 5 to 6 absolute atmospheres; and said dissolving step 5 is conducted with very concentrated nitric acid of the desired titer at temperatures of below 0° C.

To carry out the invention, the gas mixture can be contacted with the concentrated nitric acid at the temperature and pressure desired to dissolve the nitrogen oxides they contain in the said concentrated nitric acid, after which the solution obtained is used to carry out the subsequent reaction (IV) with air and an additional amount of water. This contact can be carried out in a dissolver column comprising superimposed plates on which the nitric acid flows downwardly while the vapors to be dissolved pass through the plates in a counter-current, the concentrated nitric acid being preferably taken from that resulting from the entire process.

The water necessary for the above reaction (IV) is then preferably that resulting from the condensation of the steam contained in the catalytic combustion gases of ammonia, and which already contains a certain amount of nitric acid. However, taking into account the amount of steam produced during the said combustion, the maximum titer which can be obtained for the acid produced is approximately 75% $HNO_3$ if all the water resulting from the condensation of said steam is used.

To obtain a higher titer, it is therefore necessary to remove water, either directly in the form of condensates with very low $HNO_3$ titers, obtained during a first condensation step, in the case of catalytic oxidation at atmospheric pressure or, for instance, by partial distillation of the condensates of the cooler-condenser positioned down-stream of the catalyst-heat recovery unit in the case of catalytic oxidation under pressure.

However, it is particularly advantageous prior to the dissolving described hereinabove, to carry out condensation and absorption of the nitrogen oxides in nitric acid of low concentration, according to the antimethodic process described in French Pat. No. 1,583,251 and in U.S. Pat. No. 3,658,472.

Said antimethodic process consisting in contacting the nitrous vapors with nitric acid at low concentration by bubbling said vapors through said acid, with simultaneous cooling of the latter, whereby vapors lower in nitrous gas and an acid of higher concentration are obtained, the said vapors lower in nitrous gas after a pause in an oxidation zone are again contacted with said acid of higher concentration by bubbling with simultaneous cooling, and so on, until an acid of the desired concentration is obtained, the length of stay in the successive oxidation zones being determined by the kinetics of the reaction.

The nitric acid resulting from this antimethodic condensation is then directly subjected to oxidation reaction (IV), while the nitrous gases which have not been absorbed are passed into the dissolver column described hereinabove and the solution of nitrogen oxides in the concentrated nitric acid thus obtained is added to the acid obtained from reaction (IV) to be subjected with the latter to flushing with air.

This second manner of proceeding, with antimethodic condensation of nitrous vapors, has many advantages. It is, notably, possible to avoid the elimination and all the drawbacks this entails, of the portion of water corresponding to the difference between the concentration of the acid to be produced and the concentration of 75% mentioned hereinabove.

In fact, the portion of undesirable water can thus be passed into an acid by-product at a much higher commercial concentration than those obtained by simple condensation.

Furthermore, as antimethodic condensation enables the gases to be thoroughly dried, the condensates obtained at the outlet have a sufficiently high concentration, so that the oxidation reactor can, as defined hereinabove, be supplied by means of these condensates instead of by means of the solution of nitrous gas in the concentrated acid, collected at the outlet of the dissolver column, as is the case in the first above-mentioned mode of embodiment.

The nitrous gases which have not been absorbed and which are passed into the dissolver column leave the condensor in a strongly oxidized state, which decreases the volume of oxidation required before the said column. Then again, the condensates leaving the antimethodic condensor which can have a concentration of approximately 70% $HNO_3$ and a temperature of about 0° C., have a strong dissolving power with respect to $NO_2$ and $N_2O_4$. The dissolver column can, therefore, be smaller. Dissolving is carried out with a saving of cooling, as the acid used for dissolving is reduced from the amount of acid produced by the condensor and that, furthermore, the temperature in the dissolver column can be raised.

Furthermore, the titer of the acid produced by the reactor is not necessarily the same as that of the acid supplied to the dissolver column, which permits the titer of the latter to be adjusted to the best advantage.

Other special characteristics of the invention will be brought out in the description given hereinbelow of one of its modes of embodiment, with reference to the appended drawings in which.

Figure 1:
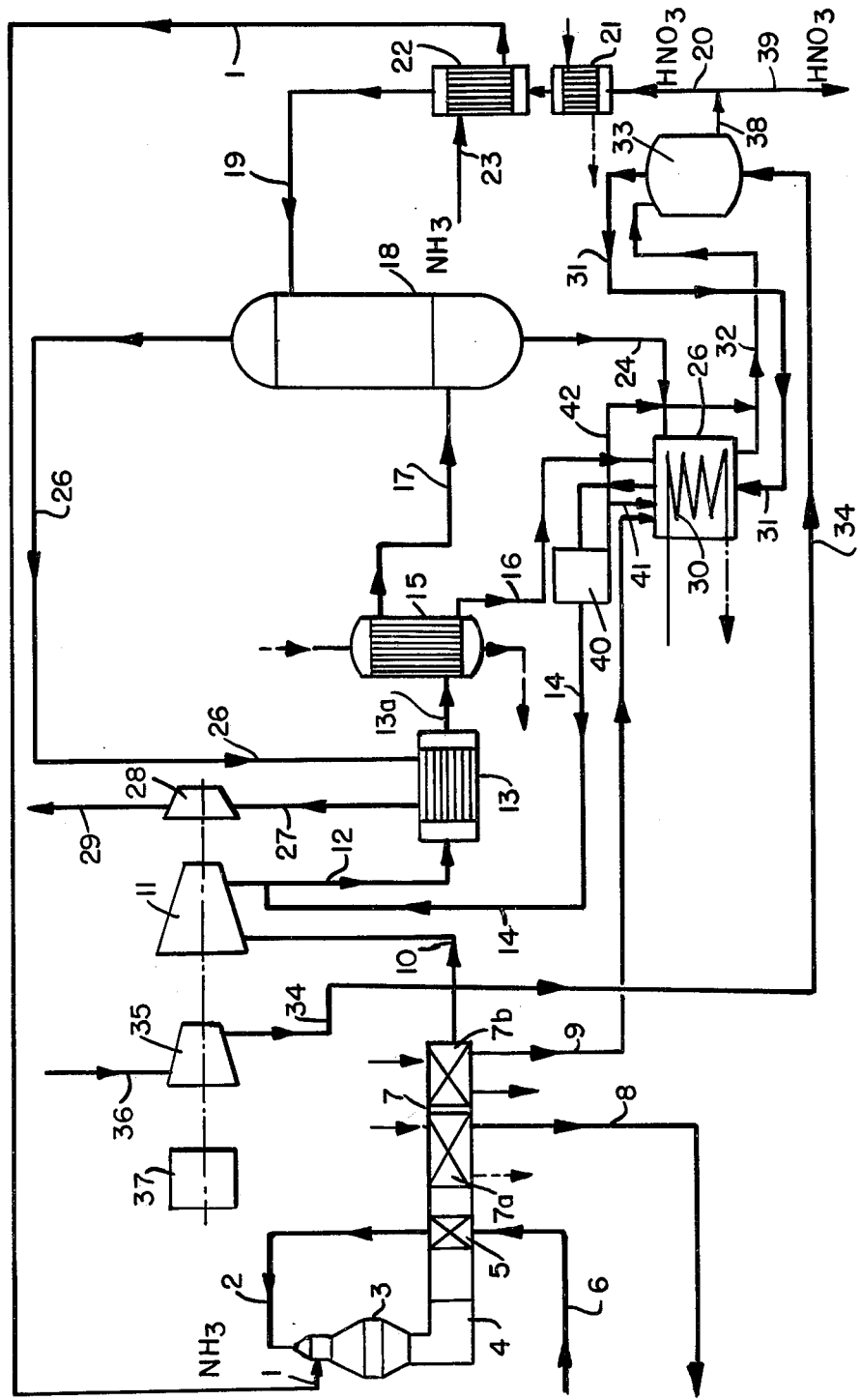
FIG. 1 is a general diagram of a first example of a unit for the manufacture of concentrated nitric acid according to the invention.

According to the diagram of FIG. 1, the ammonia combustion gases are first produced and treated in the usual manner.

To this end, gaseous ammonia and air are introduced at substantially atmospheric pressure, respectively through conduits 1 and 2, into a catalytic reactor 3 of known type for the catalytic combustion of ammonia in air. The combustion gases, issuing from reactor 3 through conduit 4, and which consist of air, nitrogen oxides NO and NO₂, steam and inert gases which first pass through a heat exchanger 5 wherein they yield a portion of their calories into the air arriving through a conduit 6, the air leaving this exchanger through conduit 2 which passes it into reactor 3.

The gases then passing into a cooler 7, comprising two portions 7a and 7b supplied independantly with cooling water both said portions being arranged and dimensioned, the first to ensure condensation of a fraction, in the order, for example, of about 25% of the steam contained in the gases (including the water which may possibly have already been condensed in exchanger 5), producing a condensate with a very low nitric acid content which is evacuated through conduit 8, to a neutralization pit (not shown) and the second, the condensation of a second fraction in the order, for example, of about 50% of the steam initially contained in the gases, producing a condensate with a higher nitric acid content which is exhausted through conduit 9 in order to be subsequently used as is described hereinafter.

The combustion gases, thus cooled and rid of a portion of the water they contained, ae then passed through channel 10 to a compressor 11 which forces them under pressure through channel 12, first into a heat exchanger 13, within which they are cooled by gas circulation, as is described hereinafter, and then, from there, through channel 13a into a water circulation cooler 15. In the unit 13-15 the gases are simultaneously cooled and subjected to oxidation of their nitrogen oxide fractions by the air they contain, to which is added the excess air arriving through channel 14 connected to channel 12, and finally to high efficiency drying, the condensation water being evacuated in the form of a nitric solution through channel 16

According to the invention, the gases leaving cooler 15, the oxidation of which has been carried out in unit 13-15 until the nitrogen oxides have undergone a practically complete transformation into NO₂ (and/or N₂O₄) are passed through channel 17 to the lower portion of a dissolution apparatus 18 consisting, in the example selected, of a cylindrical column with cylindrical extremities, provided with perforated plates (not shown). In said column, the gases charged with nitrogen oxides arriving through channel 17 meet, in a counter current, the concentrated nitric acid arriving at the upper portion through channel 19. Said concentrated nitric acid is, as will be described hereinafter, taken from the acid collected at the outlet of the installation, from where it is diverted through a channel 20 and subjected to a first cooling in a water cooler 21, then to a second cooling to a temperature slightly lower than 0° C., in a NH₃ liquid cooler 22, from which it emerges through channel 19 connected to the upper portion of column 18. The liquid ammonia enters cooler 22 by channel 23; and after it evaporates to cool the concentrated nitric acid, it is dispatched in a gaseous form to the catalyst reactor 3 through conduit 1 connected to the outlet of cooler 22.

In column 18, the nitrogen oxides contained in the gases arriving through conduit 17, and in which they are almost completely in the form of NO₂ (and/or N₂O₄), pass into solution in the concentrated nitric acid arriving through channel 19. The solution thus obtained is passed through channel 24, connected to the base of column 18, into a reactor 25 described in greater detail hereinafter. The tail gases, consisting mainly of air and inert gases and almost totally devoid of nitrogen oxides, are freed of their acid media and exhausted from the head of column 18 through channel 26 which conveys them to the exchanger 13 in which they are reheated by the ammonia combustion gases previously compressed by compressor 11, after which they are conveyed by channel 27 to a gas turbine 28 which participitates in driving compressor 11, as well as another compressor which is mentioned hereinafter, the gases being finally evacuated into the atmosphere through the exhaust pipe 29.

The oxidation reactor 25, consisting of a closed cylindrical enclosure provided internally with a temperature-maintaining coil 30, receiving, on the one hand, through channel 24 as has been stated hereinabove, the solution of nitrogen oxides in the concentrated nitric acid issuing from column 18 and, on the other hand, through conduits 9 and 16, the condensates consisting of water with a low HNO₃ content obtained, respectively, from coolers 7b and 15 and, finally air charged with nitrogen oxides arriving through a channel 31. In said reactor, the nitrogen oxides contained in the acid solution issuing from column 18 and in the air arriving through pipe 31 are oxidized by atmospheric oxygen in the presence of the water of the condensates, the overall phenomenon corresponding to the reaction:

$$2\ NO_2\ (\text{and/or}\ N_2O_4) + \tfrac{1}{2}O_2 + H_2O \rightarrow 2\ HNO_3 \qquad (IV)$$

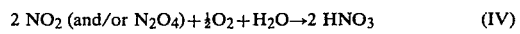

Therefore, there emerges from reactor 25, on the one hand, a gas mixture consisting of air weak in oxygen and nitrous products which have not reacted in the reactor, and which is returned through channel 14, after cooling in a cooler 40 positioned upstream of the dissolution column 18 and, on the other hand, through channel 32, a mixture consisting of nitric acid of a titer equal to that which it is desired to obtain, containing in solution the nitrous products which have not reacted in the reactor. The condensates from the cooler 40 can either be reintroduced partially or entirely into reactor 25 through channel 41, or added through channel 42 to the mixture issuing from said reactor. The mixture containing concentrated nitric acid flowing out of reactor 25 through channel 32 is passed into a denitrating apparatus 33 where, by blowing in counter-current with air, it is cleansed of dissolved nitrogen oxides. The air is passed under pressure into the denitrator 33 through a conduit 34, further connected to the discharge of a compressor 35 drawing in outer air at 36, driving of the group of compressors 35 and 11, coupled to a same line of shafts, being ensured, in addition to turbine 28 by an additional driving group 37.

The concentrated nitric acid, freed of the nitrogen oxides it held in dissolution, is evacuated from the denitrifier through conduit 38, to which is connected conduit 20 for removing the acid necessary for dissolution in column 18 and a conduit 39 carrying the nitric acid produced to the storage reservoir.

The optimum, and non-limiting conditions for reaction (IV) to develop normally in reactor 25, and to permit an acid titering at least 80% to be obtained under economic conditions are approximately:
temperature: 80° C.
pressure: 6 absolute atmospheres
Mean titer (condensates + recycled acid) 75%
$N_2O_4$ content of the recycled acid: 20% by weight of the mixture.

These conditions can be obtained, for instance, if the recycled acid is introduced into the top of the dissolution apparatus at a temperature slightly lower than 0° C. and if dissolution takes place at a total pressure of 6 absolute atmospheres. Coil 30 can, in case of need, be used to maintain the desired temperature in the reactor.

Figure 2:
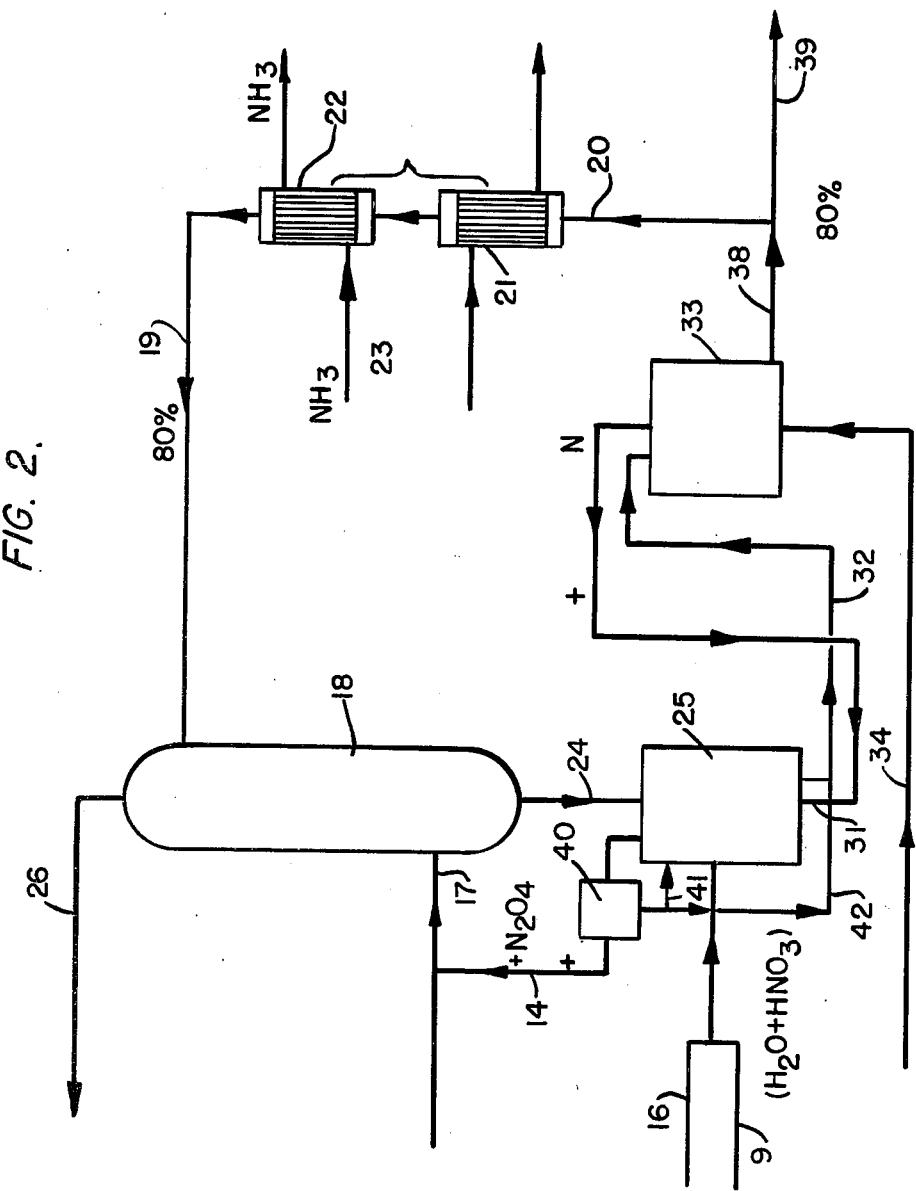
FIG. 2 is a portion of this diagram, on a larger scale, showing more clearly the operation of the process according to the invention.
Figure 3:
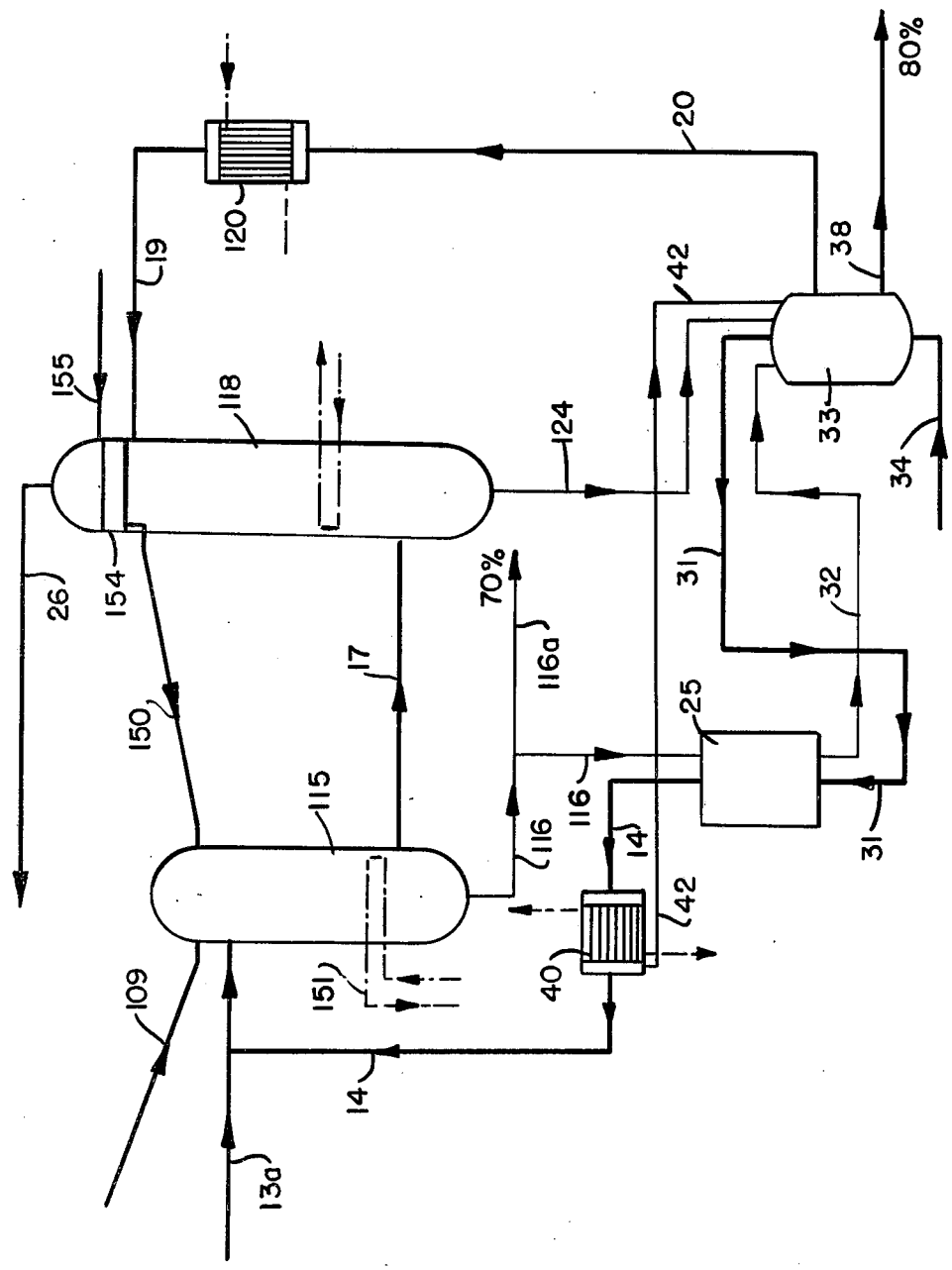
FIG. 3 is a diagram of the final portion of a unit for the manufacture of nitric acid according to a second example of embodiment of the invention.
Figure 4:
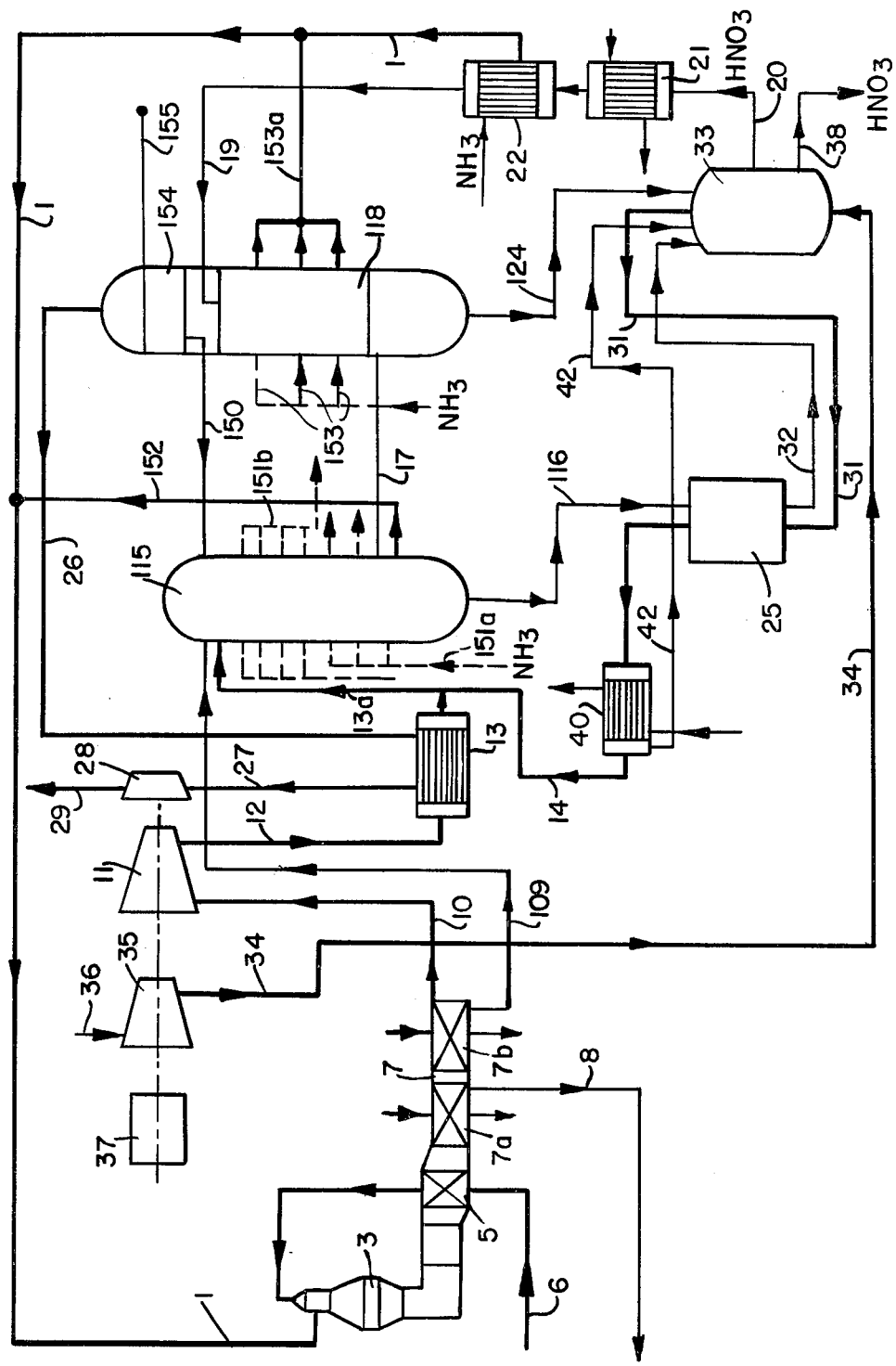
FIG. 4 is a diagram of a complete unit for the manufacture of nitric acid from the combustion gases of ammonia and air, at atmospheric pressure, comprising the portion of the unit shown in FIG. 3.
Figure 5:
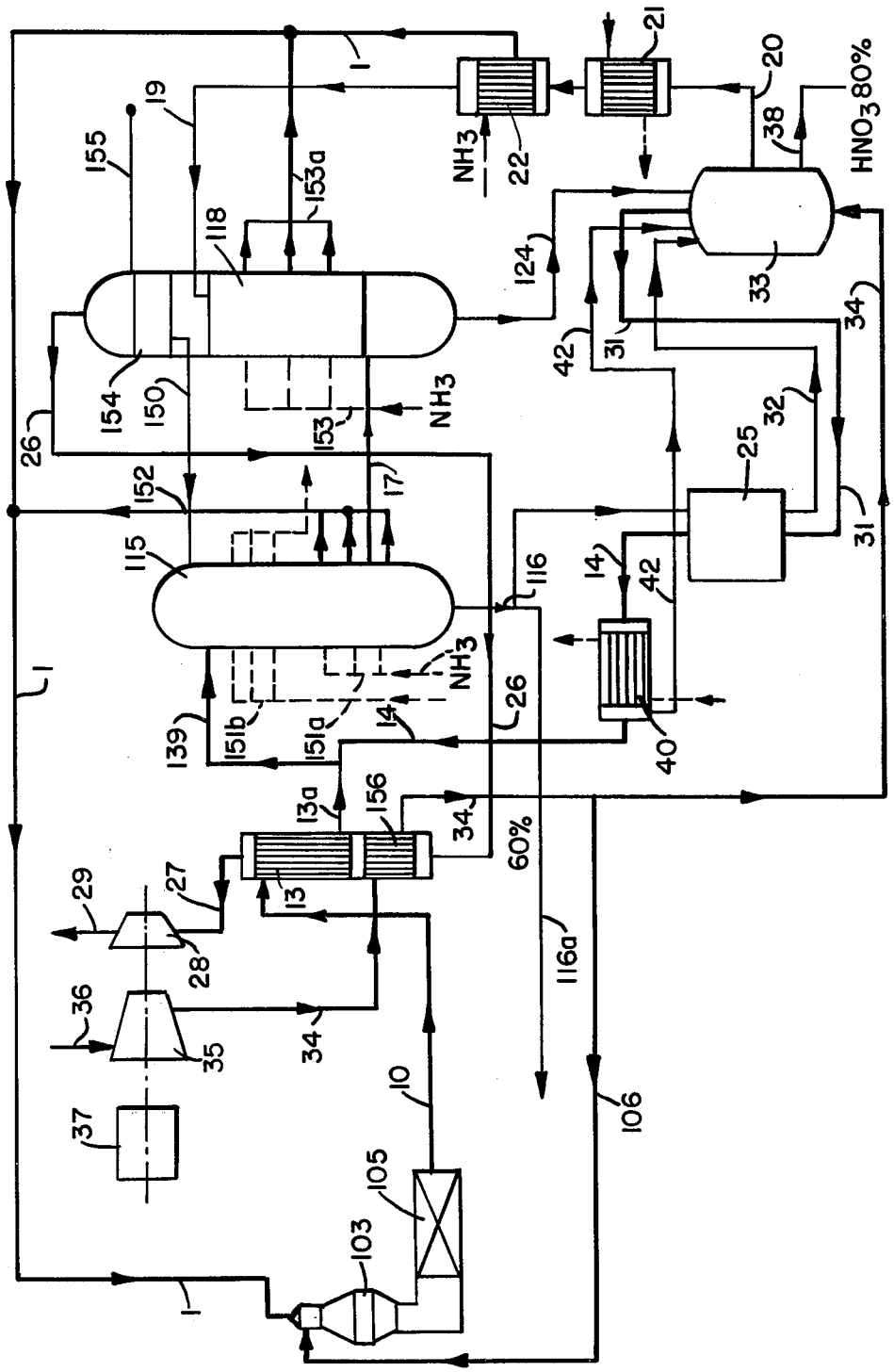
FIG. 5 is a similar diagram corresponding to the use of gas obtained for the combustion of ammonia under pressure.

In the diagrams of FIGS. 3 to 5, the apparatus, channels and conduits which are identical, at least in their functions, to those of FIGS. 1 and 2, have been designated by the same reference numbers. The apparatus and conduits which, while fulfilling, at least partially, similar functions to those of the corresponding elements of the diagrams of FIGS. 1 and 2, have been designated by the same reference numbers as these latter elements, with 100 added to them.

As is seen in FIG. 3, the gases containing nitrogen oxides (NO and $NO_2$) and a proportion of steam which is all the same notable, precompressed to a pressure in the range of 5 to 6 absolute atmospheres and partially cooled, arrive through channel 13a and have excess air, charged with nitrogen oxides, added thereto which issues from reactor 25 by channel 14. They then pass into a condensor 115 operating according to the process described in French Pat. No. 1,583,251 which is referred to herein as far as concerns the detailed description of said process.

According to said process, the gases charged with nitrogen oxides are contacted with nitric acid at low concentration by bubbling said vapors through said acid, with concommitant cooling of the latter, whereby vapors weak in nitrous gas and a acid of higher concentration are obtained, the said weakened vapors are again contacted, by bubbling with cooling, after pauses in successive oxidation zones, increasing from the first contacting operation until the last.

The nitric acid at low concentration is supplied either through channel 109 of cooler 7b (FIG. 4) which ensures, as has been described hereinbefore, preliminary condensation of a portion of the steam contained in the gases treated, or, through a channel 150, from a scrubber described hereinafter and adapted to remove the gases included therein and the nitrogen oxides which might still be contained in the treated gases, after dissolution in nitric acid at high concentration, in the dissolution column 118 as has been described with respect to FIG. 1, as 18, or simultaneously from both the above-mentioned sources. The cooling system of condensor 115 is schematized at 151 in the diagram of FIG. 3 and can be a system supplied with liquid $NH_3$, as is shown in 151a (FIG. 4) in which case the ammonia, after expansion, is returned by manifold 152 to the supply channel 1 of the catalytic combustion reactor 3, or with water (151b, FIG. 4). In said condenser there is formed a mixture of nitric acid having a $HNO_3$ content lower than or equal to 70%, and nitrous products dissolved in said acid, which is evacuated by channel 116. The whole of this mixture can be passed into reactor 25 through channel 116, or a portion thereof can be drawn off through line 116a to be used elsewhere.

It is the nitrous gases dissolved in said mixture and the water contained in the latter which react, in reactor 25, with the air which also contains nitrous gas, issuing from the denitrator through channel 31, to form an excess amount of nitric acid at high concentration, according to reaction (IV):

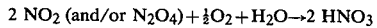

$$2\ NO_2\ (\text{and/or}\ N_2O_4) + \tfrac{1}{2}O_2 + H_2O \rightarrow 2\ HNO_3$$

The titer of the nitric acid introduced into reactor 25 is thus raised, and a nitric acid having a $HNO_3$ content as high as, or even higher than, 80% is drawn off from said reactor through channel 32 and passed into denitrator 33.

The gas mixture consisting of air weak in oxygen and nitrous products which have not reacted in reactor 25 then passes into a cooler 40, wherein a condensate is produced which is returned to the denitrator through channel 42, after which the said gas mixture, weaker in nitrous products, is returned by channel 14 to channel 13a arriving at condensor 115.

The gases issuing from the condensor are passed through channel 17 to the dissolution column 118 which operates and is supplied with 80% nitric acid, as is column 18 described with respect to FIGS. 1 and 2, except that, on the one hand, column 118 includes a cooling circuit schematized as 153 which permits the conditions of dissolution of nitrogen oxides in the concentrated nitric acid to be improved and, on the other hand, the gases which have not been dissolved and which consist of air and inert gases, contain a small amount of nitric vapors and nitrogen oxides, pass into a scrubber 154 consisting, for example, of a bubbling plate, where they meet a stream of water supplied by conduit 155, which entrains practically all the nitric vapors and nitrogen oxides which they contain, the resulting tail gases can be passed, as is provided for in FIG. 4, to the recovery turbine 28. As they contain practically no more nitrous products there is no drawback to their being evacuated into the atmosphere through channel 29. If the cooling fluid of cooling system 153 of column 118 is ammonia, the resulting gas is (FIG. 4) passed from the supply line 1 to the combustion reactor 3 by a manifold 153a.

The mixture of nitric acid at 80% $HNO_3$ and oxidized nitrogen oxides in the stage of $NO_2$ and/or $N_2O_4$ are evacuated from the lower portion of the dissolution column 118. Contrary to what has previously been described with reference to FIGS. 1 and 2, said mixture is not passed into reactor 25 but, through channel 124, directly to the denitrator 33, wherein the nitrogen oxides are separated therefrom by the flow of compressed air supplied through channel 34. The air charged with said nitrogen oxides and those simultaneously extracted from the nitric acid produced in the reactor 25, and the condensate supplied to the denitrator through channel 42 is then passed into reactor 25 through channel 31, whereas a portion of the nitric acid at high concentration evacuated from the denitrator is recycled through channel 20 to the absorption column 118, and the remainder constitutes the acid produced in pipe 38.

It is seen that when the operation is carried out according to the invention by using a condensor 115 of the antimethodic type, the only objective of the dissolution carried out in column 118 is to ensure the recovery of the nitrous products which have not reacted or been absorbed in the condensor 115, the liquid mixture evacuated from the base of the column simply being passed to the denitrator, and not to the reactor, the dimensions of which can therefore be substantially reduced with respect to what they would be if the operation were carried out in accordance with what is described hereinabove with respect to FIGS. 1 and 2.

The diagram of FIG. 5 relates to the case where the treated gases obtained from the catalytic combustion of ammonia at a pressure higher than atmospheric pressure, in the range of 5 to 6 absolute atmospheres for instance. As can be seen, the only difference from the process described with respect to FIG. 4 lies in the fact that the air used for the combustion of ammonia is previously compressed, the gaseous $NH_3$ supplied through conduit 1 also being under pressure. In as far as concerns the air supplied to the catalytic combustion reactor under pressure 103, it is supplied through channel 106, consisting of a branching from the outlet pipe 34 of the air compressor 35 supplying the denitrator 33.

In as far as the ammonia is concerned, its evaporation pressure in the various cooling systems 22, 151a and 153 is controlled whereby the desired pressure is obtained in channel 1. Furthermore, the combustion gases are already at the desired pressure for their subsequent treatment, and compressor 11 of the preceeding examples can be abolished. In this case, there is no preliminary condensation of the steam contained in these gase, the production of nitric acid of a titer lower than or equal to about 70% in condensor 115 is increased, permitting a portion of said acid to be diverted through channel 116a for external use.

The combustion gases, after being passed through a heat recovery vessel 105, which can be used to produce steam, used directly for reheating, in exchanger 13, the tail gases issuing from the scrubber 154 positioned at the top of the absorption column 118, the said tail gases undergoing a preliminary reheating in an additional exchanger 156, interposed on outlet line 34 from the air compressor 35.

There has been described hereinabove, with respect to FIGS. 4 and 5, the application of the process according to the invention to the treatment of gas from the catalytic combustion of ammonia to produce nitric acid at very high concentration. However, the process can equally well be applied to the treatment of all other gaseous mixtures containing nitrogen oxides and steam. Said mixtures, after removal of the excess steam which they may possibly contain, in a cooling system such as unit 7 of FIG. 4 and, should the occasion arise, preliminary compression to attain the desired pressure for the treatment, are then introduced either through channel 12 of the installation shown in FIG. 1, or through channel 13a of that shown in FIG. 3.

The following examples explain the working conditions of the process according to the invention, for the production of nitric acid at 80% $HNO_3$ in various cases of supply.

EXAMPLE 1

Use of a gas mixture obtained from the catalytic combustion of ammonia at atmospheric pressure in the installation of FIGS. 1 and 2.

Into the catalytic reactor 3, which is of the known type using fabrics made of platinum alloy wires there is introduced through conduit 1, at atmospheric pressure, 2430 $Nm^3/h$ of gaseous ammonia at the temperature resulting from the expansion of liquid ammonia in the cooler 22 and, through conduits 2 and 6, 19,660 $Nm^3/h$ of air raised to a temperature of 120° C. by passing it through the exchanger 5.

The flow rate of the mixture of combustion gases issuing from reactor 3, after passing through heat exchanger 5, is 22,700 $Nm^3/h$ at a temperature of 110° C., said gases containing, by volume, 10.5% NO and $NO_2$ and 18% steam. 76.7% of the steam is condensed in cooler 7, producing in the first portion 7a, 820 kg/h condensates at 0.5% $HNO_3$ evacuated through pipe 8 and, in the second portion 7b, 1775 kg/h condensates at 2% $HNO_3$ passed through pipe 9 to reactor 25. The gases under slight pressure, issuing from cooler 7 through pipe 10 at a rate of 19,305 $Nm^3/h$, are compressed to 5.6 absolute atmospheres by compressor 11 then admixed with the gases issuing from reactor 25 and arriving by pipe 14 at a rate of 8000 $Nm^3/h$, all the nitrogen oxides being calculated in the form of NO and $NO_2$. After cooling at 120° C. by thermal exchange with the tail gas from the dissolution column 18, and oxidation at a high level in exchanger 13, the gases at 120° C. undergo simultaneously, in cooler 15, a high-efficiency drying, cooling and oxidation. Said cooler 15 providing, on the one hand; 1785 kg/h of condensates at 60% $HNO_3$ which are passed through pipe 16 to reactor 25, and on the other hand, 25,120 $Nm^3/h$ of gas at 15.7% by volume of nitrogen oxides calculated in NO and $NO_2$ the oxidation of which is very nearly 100%, which are passed through pipe 17 at the foot of the dissolution column 18.

In this column, which is 2.8 m in diameter with a cylindrical height of 5 m, the upper portion of which is supplied, at 19, with 31,270 kg/h nitric acid at 80% $HNO_3$ previously cooled to −10° C. by the water coolers 21 and liquid $NH_3$ cooler 22, where the gaseous ammonia necessary for catalytic combustion is evaporated; 99.5% of the nitrogen oxides are dissolved in the nitric acid by counter-current between the gas and the acid. 21,200 $Nm^3/h$ of gas containing 0.1% nitrogen oxides issue from the zone at the upper portion through channel 26, and a mixture consisting of 31,270 kg/h nitric acid at 80% $HNO_3$ and 8060 kg/h dissolved nitrogen oxides issue from the lower portion through pipe 24. This mixture, together with the condensates from pipes 9 and 16, is passed into reactor 25, which is 2.8 m in diameter with a cylindrical height of 5 m operating at a pressure of 6 absolute atmospheres and a temperature of 80° C., which is also supplied through pipe 31 with a mixture containing 6850 $Nm^3/h$ air and nitrogen oxides from the denitrator 33. The time the liquid mixture remains in the reactor is adapted so that 50% of the nitrogen oxides in the liquid mixture supplied through pipe 24 are converted into $HNO_3$ according to reaction (IV). The mixture issuing from the reactor through pipe 32, consisting of 39,560 kg/h nitric acid at 80% $HNO_3$ with dissolved nitrogen oxides, enters the denitrator 33 where it meets a counter-current of 6850 $Nm^3/h$ air at 6.1 absolute atmospheres from the air compressor 35 through pipe 34. The air entrains the nitrous products and at the outlet of the denitrator 39,560 kg/h nitric acid at 80% $HNO_3$ is obtained, consisting of 31,270 kg/h acid which is recycled through conduits 20 and 19 into the dissolution column 18, and 8290 kg/h acid containing 6630 kg/h $HNO_3$ which constitutes the acid produced passed to a stocking unit through pipe 39. The production of such an installation is therefore about 160 T/day of nitric acid calculated at 100%.

To obtain an acid with a titer higher than 80% $HNO_3$ it is possible, for example, to increase the time the mixture remains in reactor 25 and/or the discharge pressure of compressors 11 and 35.

A calculation of the economics of the reaction enables the most suitable solution to be selected, taking local considerations into account.

The nitric acid obtained can then be subjected to distillation to obtain a highly concentrated acid.

EXAMPLE 2

Use of a gas mixture obtained from catalytic combustion of ammonia at atmospheric pressure in the installation of FIGS. 3 and 4.

2430 $Nm^3/h$ gaseous ammonia at ambient temperature is introduced through conduit 1, at atmospheric pressure, into the catalytic reactor 3, which is of the same type as in example 1 consisting of a platinum alloy as catalyst, and through conduit 6, 19,660 $Nm^3/h$ air heated to a temperature of 120° C. by being passed through exchanger 5.

The flow rate of the mixture of combustion gases issuing from reactor 3, after passing through heat exchanger 5, is 22,700 $Nm^3/h$ at a temperature of 110° C., said gases containing, by volume, 10.5% NO and $NO_2$ and 18% steam. 76.7% of the steam is condensed in cooler 7 producing in the first portion 7a thereof, 1040 kg/h of condensates at 0.5% $HNO_3$ evacuated through pipe 8, and in the second portion 7b, 1560 kg/h of condensates at 2% $HNO_3$ passed through pipe 109 into the top of condensor 115.

The gases under slightly reduced pressure leaving cooler 7 through pipe 10, at a rate of 19,305 $Nm^3/h$ are compressed to 5 to 6 absolute atmospheres by compressor 11, oxidized, and then cooled by heat exchange in exchanger 13, with the tail gases issuing from the dissolution column 118, after passing through scrubber 154. 8000 $Nm^3/h$ of gas issuing from reactor 25 through pipe 14 and having been cooled in cooler 40, are then added to said gases at 120° C. The gases then penetrate into the antimethodic condensor 115, supplied at the upper portion thereof with the condensates from the second portion 7b of cooler 7, through pipe 109, and with 360 kg/h of acid at about 15% $HNO_3$, supplied through pipe 150 from scrubber 154.

Said antimethodic condensor, provided with cooling coils using water or a cooling fluid, permit the production of 4580 kg/h of acid at 70% $HNO_3$ (containing about 10% by weight of dissolved nitrous products) which is passed (pipe 116) to the reactor.

This condensor, which is of the type described in French Pat. No. 1,583,251, comprises 11 plates. The gases penetrate therein through pipe 13a at a temperature of about 85° C. The cooling fluid is either water circulating in system 151b at a temperature of 24° C., at the input of each coil, or liquid ammonia arriving at system 151a and vaporizing therein at a temperature corresponding to the pressure of the system. Table A gives, with height h and the time the gases remain between two successive plates, the respective characteristics of the gases and acid arriving at each plate.

TABLE A

| Pl N° (n) | $h^{(1)}$ (m) | Gas arriving at plate n | | The time it remains (sec.) | Acid arriving at plate n | | Amount of acid produced (%) |
|---|---|---|---|---|---|---|---|
| | | NO + $NO_2$ (%) | $H_2O$ (%) | | $HNO_3$ (%) | Temp. (°C.) | |
| 1 | 2,4 | 13,4 | 3,5 | 25,7 | 4,4 | 30 | 35,7 |
| 2 | 1,2 | 11,6 | 3,4 | 14,1 | 52,8 | 81 | 21,5 |
| 3 | 1,2 | 10,7 | 1,8 | 15,4 | 58,3 | 65 | 13,5 |
| 4 | 1,3 | 10,0 | 0,6 | 17,9 | 61,4 | 44 | 7,9 |
| 5 | 1,6 | 9,6 | 0,3 | 22,4 | 63,7 | 29 | 4,5 |
| 6 | 1,6 | 9,1 | 0,2 | 22,9 | 65,1 | 25 | 4,5 |
| 7 | 1,7 | 8,6 | 0,15 | 25,1 | 66,4 | 16 | 3,5 |
| 8 | 1,7 | 8,2 | 0,12 | 26,2 | 67,6 | 14 | 3,3 |
| 9 | 1,8 | 7,8 | 0,10 | 28,4 | 68,6 | 11 | 2,7 |
| 10 | 1,9 | 7,2 | 0,09 | 30,1 | 69,2 | 8 | 1,5 |
| 11 | | 7,0 | 0,085 | | 69,6 | 8 | 1,4 |
| $H^{(3)}$ (m) | | gas issuing from the last plate NO + $NO_2$ (%)$^{(4)}$ | | | Acid leaving the last plate | | |
| 6,9 | | 0,08 | | | 70,0 | 8 | 100 |

$^{(1)}$h: height in meters between plates n and n + 1
$^{(2)}$The time in sec. that gases remain between plates n and n + 1
$^{(3)}$H = total height
$^{(4)}$after deduction of the $NO_2$ dissolved in the acid.

From the lower portion of condensor 115 there issues, on the one hand, 4580 kg/h nitric acid at 70% $HNO_3$ containing about 10% by weight of dissolved nitrous products, said acid being passed through pipe 116 to reactor 25 and, on the other hand, 25,400 $Nm^3/h$ of gas containing 6.9% NO and $NO_2$, which are passed through pipe 17 to the base of dissolution column 118.

A mixture composed of 22,300 kg/h nitric acid at 80% $HNO_3$ and 3540 kg/h dissolved nitrogen oxides flow from the lower portion of said column through pipe 124, and 23,675 $Nm^3/h$ of gas containing very small amounts of nitric vapors and nitrogen oxides flow from the upper portion thereof.

Said gases flowing into scrubber 154 supplied with a counter-current of 300 kg/h water arriving through pipe 155, the major amount of the nitrogen oxides and the nitric vapors of the gas being absorbed by said water, and the gas issuing from pipe 26, which no longer contains nitric vapors and less than 500 ppm nitrogen oxides, is passed into the heat exchanger 13.

In denitrator 33 supplied with the mixture from the dissolution column 118 and the condensate supplied through pipe 42 and the liquid mixture issuing from the reactor through pipe 32, 7100 Nm³/h air at 6 absolute atmosphere is passed through pipe 34 in a counter-current which cleanses the nitric acid of 80% of the dissolved nitrogen oxides. 30,633 kg/h nitric acid at 80% $HNO_3$ issued from the denitrator 33, a portion (8333 kg/h) of which constitutes the acid produced, extracted through pipe 38, and the other portion (22,300 kg/h) constitutes the acid recycled through pipe 20 to the dissolution column 118 and, on the other hand, through pipe 31, a gaseous mixture containing air and completely oxidized nitrogen oxides, which is supplied to reactor 25.

In reactor 25, having a diameter of 2 m and a cylindrical height of 5 m, and which receives, through pipe 116, a mixture containing 4580 kg nitric acid at 70% $HNO_3$ and 509 kg of dissolved nitrogen oxides, and also the gas mixture issuing from the denitrator through pipe 31, nitric acid is produced which enables the titer of the nitric acid introduced to be raised from 70 to 80% $HNO_3$. A mixture containing 8330 kg/h nitric acid at 80% $HNO_3$ and nitrogen oxides dissolved in said acid is thus obtained from reactor 25, to be passed into the denitrator 33 through pipe 32.

EXAMPLE 3

Use of a gas mixture obtained from the catalytic combustion of pressurized ammonia in the installation of FIG. 5, producing 100 T/day of nitric acid calculated in 100%, 60 T at a concentration of about 60% and 40 T at a concentration of about 80%.

In this example, the catalytic reactor 103 which is of the same type as in the preceeding example, receives both gaseous ammonia through pipe 1 at a pressure of 6.0 absolute atmospheres, the evaporation pressure in the cooling systems 22, 151a and 153 having been adjusted for this purpose and, through pipe 106, 14190 Nm³/h of air compressed to the same pressure by compressor 35 and raised to a temperature of 180° C. by its passing through exchanger 156.

The flow rate of the combustion gases, after passing through the recovery reactor 105, is 15,400 Nm³/h at a temperature of 265° C., said gases containing, by volume, 9.8% NO and $NO_2$ and 16.80% steam. After passing through exchanger 13 these same gases, in which the NO undergoes additional oxidation, are at a temperature of 190° C. and a pressure of 5.9 absolute atmosphere. They are then combined with the gases issuing from reactor 25 and arriving through pipe 14 at a rate of 3525 Nm³/h at a temperature of 30° C. and they enter condensor 115.

Said condensor is of the same type as that used in the preceeding example and comprises 6 plates.

The gases enter it through pipe 13a at a temperature of about 150° C. The cooling liquid is either water entering system 151b at 20° C. or liquid ammonia which vaporizes at the temperature corresponding to the pressure of the system.

The Table B contains, for the present example, the indications corresponding to those of Table A of the preceding Example 2.

TABLE B

| Pl N° (1) | $h^{(1)}$ (m) | Gas arriving at plate n | | The time it remains (sec.) | Acid arriving at plate n | | Amount of acid produced (%) |
|---|---|---|---|---|---|---|---|
| | | NO + $NO_2$ (%) | $H_2O$ (%) | | $HNO_3$ (%) | Temp. (°C.) | |
| 1 | 1,5 | 13,7 | 13,5 | 7,5 | 10 | 20 | 17,3 |
| 2 | 1,2 | 13,1 | 12,7 | 6,5 | 46,7 | 108 | 19,7 |
| 3 | 1,2 | 12,6 | 9,2 | 7,1 | 50,7 | 101 19,7 | |
| 4 | 1,2 | 12,0 | 5,7 | 7,6 | 53,1 | 90 | 17,7 |
| 5 | 1,5 | 11,3 | 3,1 | 10,3 | 55,8 | 76 | 14,4 |
| 6 | 0,6 | 10,6 | 1,5 | 4,3 | 58,5 | 62 | 11,2 |

| $H^{(3)}$ (m) | gas leaving the last plate$^{(4)}$ | | Acid leaving the last plate | | |
|---|---|---|---|---|---|
| 7,2 | 9,6 | 0,16 | 60,8 | 15 | 100 |

$^{(1)}$h: height in meters between plates n and n + 1
$^{(2)}$The time in sec. that gases remain between plates n and n + 1
$^{(3)}$H = total height
$^{(4)}$After deduction of the $NO_2$ dissolved in the acid 5300 kg/h nitric acid at about 60% $HNO_3$ containing about 2% of nitrous products issue from condensor 115 through pipe 116, 4080 kg/h of said acid passes through pipe 116a for use independently of the system, and the remaining 1220 kg/h passes through pipe 116 to reactor 25. 15030 Nm³/h of gas containing 9.6% NO and $NO_2$ is also extracted from condensor 115 through pipe 17 and is passed into the dissolution column 118.

Said column also receiving, through pipe 19, 11760 kg/h nitric acid at 80% $HNO_3$, at a temperature of about 10° C. 11760 kg/h nitric acid at 80% $HNO_3$, containing 2940 kg/h nitrogen oxides in solution issue from it through pipe 124, and from the upper portion, 13430 Nm³/h of gas which passes into scrubber 154 which receives 590 kg/h of water through pipe 155, the gases issuing from said scrubber do not contain more than 900 ppm nitrogen oxides.

2480 Nm³/h of air at 6 absolute atmospheres is passed into the denitrator, and 13845 kg/h of nitric acid at 80% $HNO_3$ is obtained therefrom, 11760 kg/h of which is recycled into column 118, the remaining 2085 kg/h constituting the acid product.

Reactor 25 receives 1220 kg/h nitric acid at 60.8% $HNO_3$ containing 100 kg dissolved nitrogen oxides from condensor 115 and the gas mixture from the denitrator. 2085 kg/h nitric acid at 80% $HNO_3$ issues from it, with dissolved nitrogen oxides, the acid being passed into the denitrator.

EXAMPLE 4

Use of an off gas mixture obtained from the manufacture of an adipic acid by the oxidation of cyclohexane, in the installation of FIG. 3.

The composition of this gas mixture, by volume, is as follows:
nitrogen oxides $NO+NO_2$: 28.6%
steam: 23.6%
oxygen: 3.4%

Its yield is 8325 $Nm^3/h$, its temperature being 70° C.

The preceeding gas mixture arriving through pipe 13a is mixed with 9160 $Nm^3/h$ gas arriving through pipe 14 from the oxidation reactor 25 after passing through cooler 40. The antimethodic condensor 115 receives said gas mixture through pipe 13a. It also receives 1050 kg/h of a dilute solution of nitric acid at 10% $HNO_3$ from the scrubber 154. This condensor is of the same type as that used in the preceeding examples. It comprises 4 plates and is cooled under the same conditions. Table C corresponds, for the operation of the condensor, to the preceeding Tables A and B.

TABLE C

| Pl N° (n) | $h^{(1)}$ (m) | Gas arriving at plate n | | The time it remains (sec.) | Acid arriving at plate n | | Amount of acid produced (%) |
|---|---|---|---|---|---|---|---|
| | | $NO + NO_2$ (%) | $H_2O$ (%) | | $HNO_3$ (%) | Temp. (°C.) | |
| 1 | 1.9 | 31.3 | 11.2 | 19.5 | 10 | 30 | 52.6 |
| 2 | 1.2 | 30.7 | 7.2 | 14.0 | 57.4 | 64 | 28.2 |
| 3 | 1.2 | 30.3 | 3.3 | 15.4 | 60.8 | 50 | 12.2 |
| 4 | | 30.0 | 1.5 | | 62.0 | | 7.0 |

| $H^{(3)}$ (m) | Gas leaving the last plate$^{(4)}$ | | | Acid leaving the last plate | | |
|---|---|---|---|---|---|---|
| 4.3 | 29.7 | 0.07 | 48.9 | 63 | 7 | 100 |

$^{(1)}$h: height in meters between plates n and n + 1
$^{(2)}$The time in sec. that gases remain between plates n and n + 1
$^{(3)}$H = total height
$^{(4)}$after deduction of the $NO_2$ dissolved in the acid.

At the outlet of condensor 115, 5590 kg/h of an acid at 63% $HNO_3$ is recovered and passed through pipe 116 to the reactor. In this example no acid is removed through pipe 116a.

The gas mixture leaving condensor 115 through pipe 17 to be introduced into the dissolution column 118 has a flow rate of 13,390 $Nm^3/h$. Column 118 further receiving, at the upper portion thereof, 16,350 kg/h of a nitric acid at 80% $HNO_3$, and at a temperature of 5° C. The nitrogen oxides contained in the gas phase pass into solution in the concentrated acid and 16,350 kg/h of acid at 80% entraining 8175 kg/h of dissolved nitrogen oxides is drawn off through pipe 124. Before leaving column 118, the 9340 $Nm^3/h$ of inert gas containing a very low concentration of nitric vapors and nitrogen oxides pass through scrubber plate 154 where they are washed in a countercurrent by 790 kg/h water. The gases, which then contain less than 500 ppm nitrogen oxides, can be returned to the atmosphere through pipe 26, they no longer present a danger of pollution.

6730 $Nm^3/h$ of air is injected through pipe 34 into the denitrator 33, which has received the acid charged with $NO_2$ through pipe 124, the condensates formed in cooler 40 through pipe 42 and the liquid mixture from the reactor through pipe 32. Said air entrains the nitrogen oxides still dissolved in the acid concentrated at 80%, a portion of which, amounting to 8330 kg/h, represents the acid product drawn off through pipe 38, the remainder, amounting to 16350 kg/h, being recycled through pipe 20 to feed column 118. The gas phase leaving the denitrator through pipe 31 is passed into the reactor 25. In the latter, which has a diameter of 2.2 m and a cylindrical height of 5.3 m, formation of nitric acid occurs which raises the concentration of the acid issuing from condensor 115 from 63% to 80%.

Such an installation, operating under a pressure of 5 absolute atmospheres, is therefore capable of producing 160 T/day of a nitric acid at 80% $HNO_3$ under economically excellent conditions.

As can be established, the invention has the advantage of permitting the manufacture of nitric acid of a titer which may be higher than 80% $HNO_3$, using an installation comprising, at the most, three essential apparatus, that is to say, an antimethodic condensation column, a dissolution column and a reactor of very small size, instead of the large absorption columns which are necessary for carrying out the earlier process. Furthermore, the operations are carried out at moderate pressure which, taking into account the steam produced by the cooling of combustion gases, permits complete independence from the point of view of power. Finally, the dissolution of nitrous vapors in nitric acid, whether the latter is concentrated or not, can be carried out without the provision of cooling other than that available in the liquid ammonia used as raw material, and nitric acid is then obtained without its being necessary to eliminate the calories given off.

We claim:

1. A continuous process for the manufacture of very concentrated nitric acid having a titer of at least 70 percent from a gaseous mixture under superatmospheric pressure containing nitrogen oxides, oxygen, inert gases, and steam, which consists essentially of:

(1) continuously passing a gaseous mixture under superatmospheric pressure of between about 5 to 6 absolute atmospheres through a cooled area, said gaseous mixture containing nitrogen oxides, oxygen, inert gases and steam, whereby the majority of said nitrogen oxides are oxidized to nitrogen dioxide and said steam is condensed to a weak nitric acid solution;

(2) continuously dissolving said oxidized nitrogen oxides in the very concentrated nitric acid solution under a superatmospheric pressure between about 5 to 6 absolute atmospheres and at a temperature below 0° C.;

(3) continuously mixing said very concentrated nitric acid solution containing dissolved oxidized nitrogen oxides, said weak nitric acid solution and air containing nitrogen oxides under superatmospheric pressure between about 5 to 6 absolute atmospheres and for a time and temperature sufficient to substantially effect the reaction $$2NO_2 \text{ (or } N_2O_4) + \tfrac{1}{2}O_2 + H_2O \rightarrow 2 HNO_3;$$

(4) continuously removing very concentrated nitric acid having a titer of at least 70 percent and containing some dissolved unconverted oxidized nitrogen oxides therein and an air stream containing nitrogen oxides and some nitric acid vapor from said mixing step;

(5) continuously treating said very concentrated nitric acid having a titer of at least 70 percent and containing some dissolved unconverted oxidized nitrogen oxides therein with air under superatmospheric pressure between about 5 to 6 absolute atmospheres whereby said dissolved oxidized nitrogen oxides are removed into said air;

(6) continuously passing said air containing oxidized nitrogen oxides to said mixing step 3;

(7) continuously passing said air stream containing nitrogen oxides and some nitric acid vapor from step 3 to said step 1; and (8) continuously recovering very concentrated nitric acid having a titer of at least 70 percent and recycling a portion thereof to said step 2.

2. A continuous process for the manufacture of very concentrated nitric acid having a titer of at least 70 percent from a gaseous mixture under superatmospheric pressure containing nitrogen oxides, oxygen, inert gases and small amounts of steam, which consists essentially of:

(1) continuously contacting a gaseous mixture under superatmospheric pressure of between about 5 to 6 absolute atmospheres containing anitrogen oxides, oxygen, inert gases and small amounts of water vapor with a weak nitric acid solution having a concentration lower than that in equilibrium with the nitrogen oxides in said gaseous mixture under the prevailing conditions with simultaneous cooling of said weak nitric acid solution whereby a gaseous mixture having a lower temperature and a lower content of $NO_2$ and water vapor and a higher content of NO and a nitric acid solution having a higher concentration are continuously obtained, respectively;

(2) continuously passing said gaseous mixture having a higher content of NO through a free space within which oxidation of NO to $NO_2$ takes place;

(3) continuously intimately contacting said gaseous mixture after passage through said free space with said nitric acid solution having a higher concentration, with simultaneous cooling of said nitric acid solution whereby the gaseous mixture after contacting said nitric acid solution has a lower content of $NO_2$ and water vapor and the nitric acid concentration is further increased;

(4) repeating said steps 2 and 3 until a nitric acid solution having a titer of about 60% and a gaseous mixture substantially dry and low in nitrogen oxides are obtained, respectively;

(5) continuously dissolving substantially all of said nitrogen oxides in said gaseous mixture low in nitrogen oxides in a very concentrated nitric acid of the desired titer under a pressure of 5 to 6 absolute atmospheres and at a temperature below 0° C.;

(6) continuously mixing said nitric acid solution having a titer of about 60% and air containing nitrogen oxides under a superatmospheric pressure between about 5 and 6 absolute atmospheres for a time and temperature sufficient to substantially effect the reaction:

$$2NO_2 \text{ (or } N_2O_4) + \tfrac{1}{2}O_2 + H_2O \rightarrow 2 HNO_3;$$

(7) continuously removing very concentrated nitric acid having a titer at least 70 percent and containing some dissolved unconverted oxidized nitrogen oxide therein, and an air stream containing nitrogen oxides and some nitric acid vapor from said mixing step;

(8) continuously mixing said very concentrated nitric acid having a titer of at least 70 percent and containing some dissolved unconverted oxidized nitrogen oxides therein with said very concentrated nitric acid having dissolved nitrogen oxides therein from step 5 and treating said mixture with air under a pressure of from 5 to 6 absolute atmospheres whereby said dissolved oxidized nitrogen oxides are removed into said air;

(9) continuously passing said air containing oxidized nitrogen oxides to said mixing step 6;

(10) continuously passing said air stream containing nitrogen oxides and some nitric acid vapor from step 6 to step 1; and

(11) continuously recovering very concentrated nitric acid having a titer of at least 70 percent and recycling a portion of it to said step 5.

* * * * *

UNITED STATES PATENT AND TRADEMARK OFFICE
CERTIFICATE OF CORRECTION

PATENT NO. : 4,276,277

DATED : June 30, 1981

INVENTOR(S) : Gerard Aguinet, Andre Le Bras, Jean Manoury and Edouard Martin.

It is certified that error appears in the above-identified patent and that said Letters Patent are hereby corrected as shown below:

In column 3, line 13, the number "932,752" should read --932,754--;

In column 7, line 52, the letters "ae" should read --are--;

In column 11, line 42, the word "gase" should read --gases--;

In column 15, line 12, and in column 16, line 8, the word "atmosphere" should read --atmospheres--;

In column 16, Table B, line 4 of the Table, the figure "(1)" should read --(n)--;

In column 16, Table B, line 7 of the Table, the numeral "101 19,7" should read --101-- and the missing numeral at the end of the line should read --19,7--;

In column 17, line 55, the word "countercurrent" should read --counter-current--; and In columns 18 and 19, claim 1 should be deleted.

Signed and Sealed this

Twenty-second Day of September 1981

[SEAL]

Attest:

GERALD J. MOSSINGHOFF

Attesting Officer

Commissioner of Patents and Trademarks